Sept. 27, 1955    R. J. MINSHALL ET AL    2,718,758
VARIABLE RATIO HYDROSTATIC TRANSMISSION
Filed July 15, 1949    5 Sheets-Sheet 5
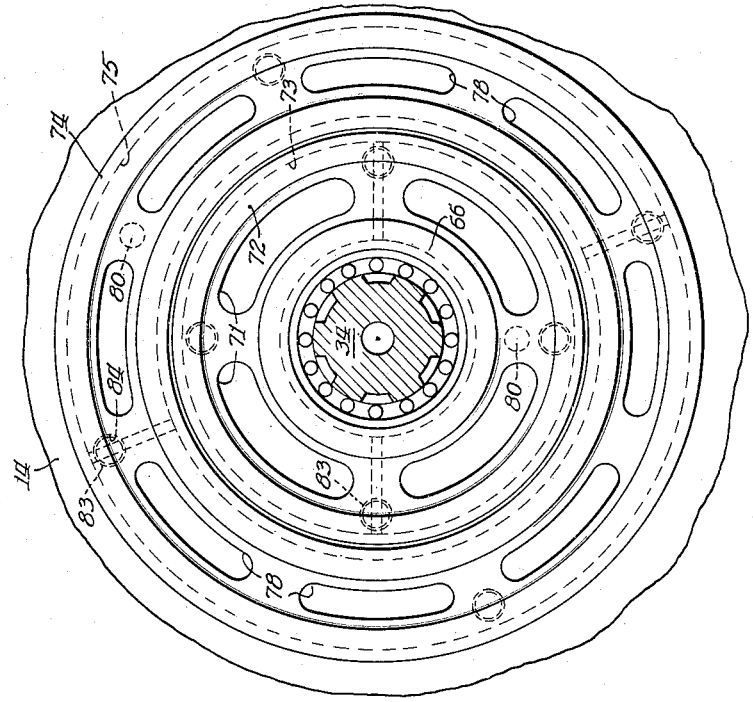
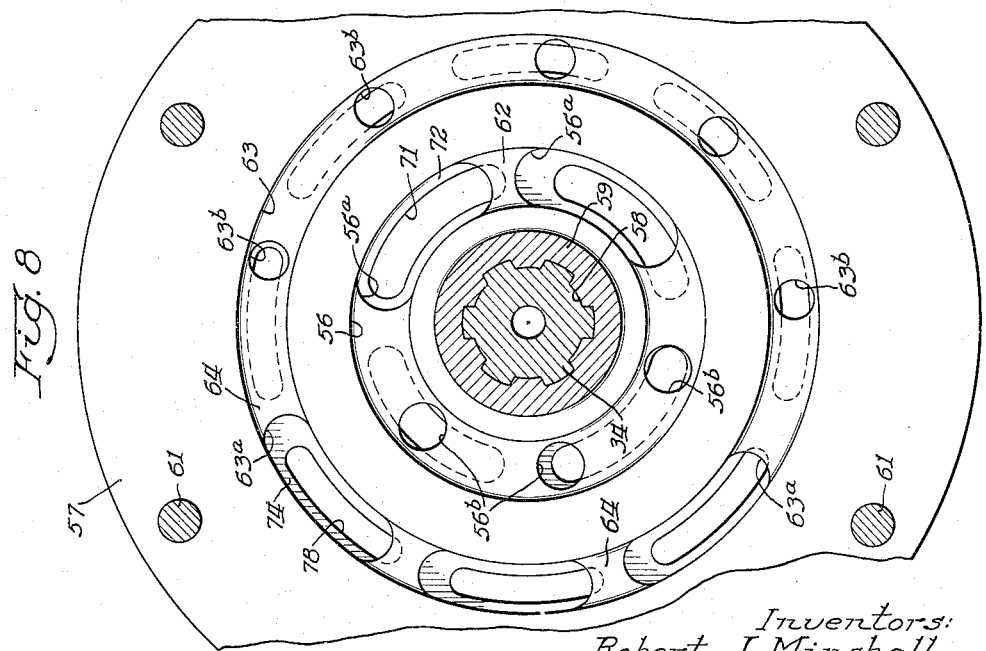
Inventors:
Robert J. Minshall and
John Kanuch

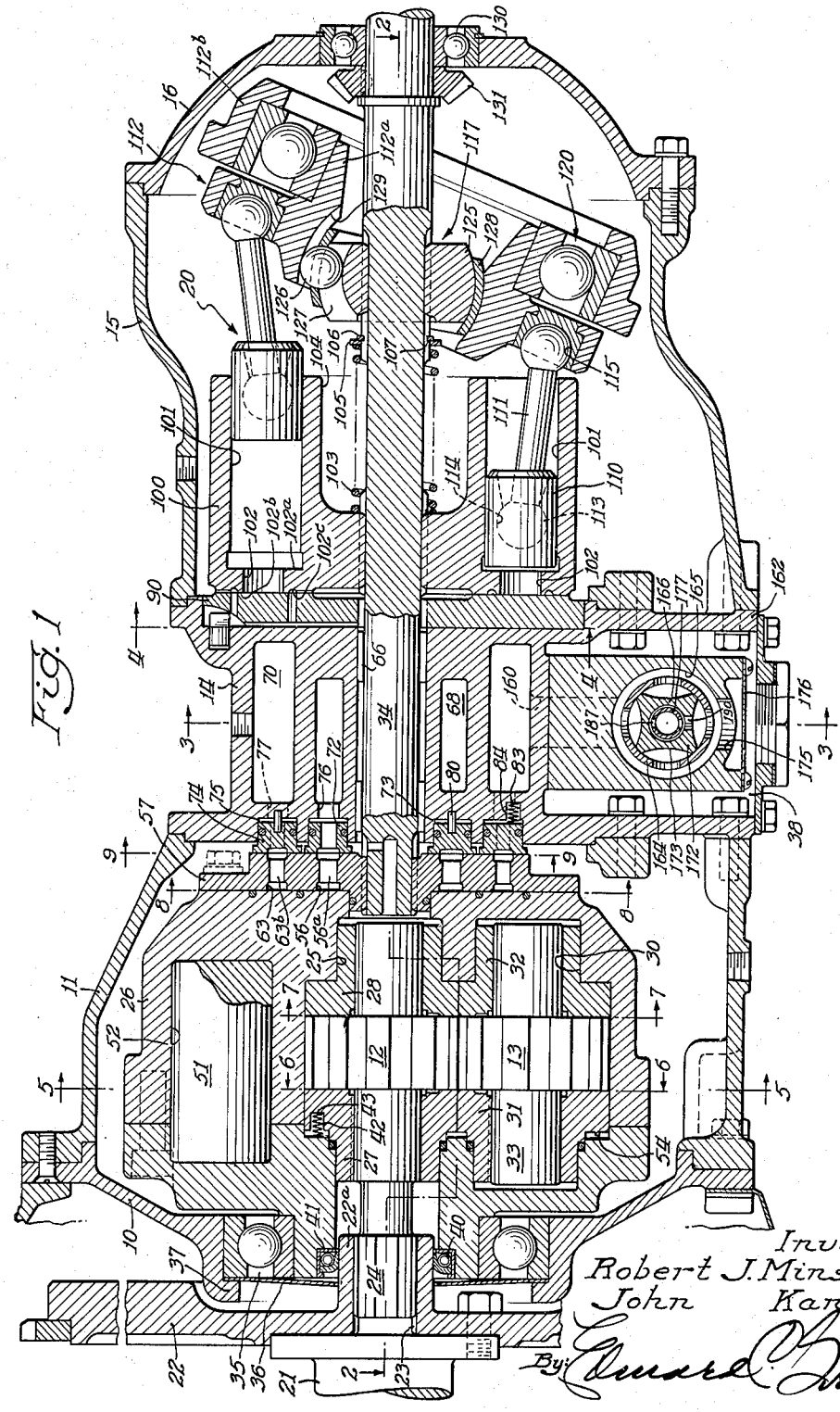

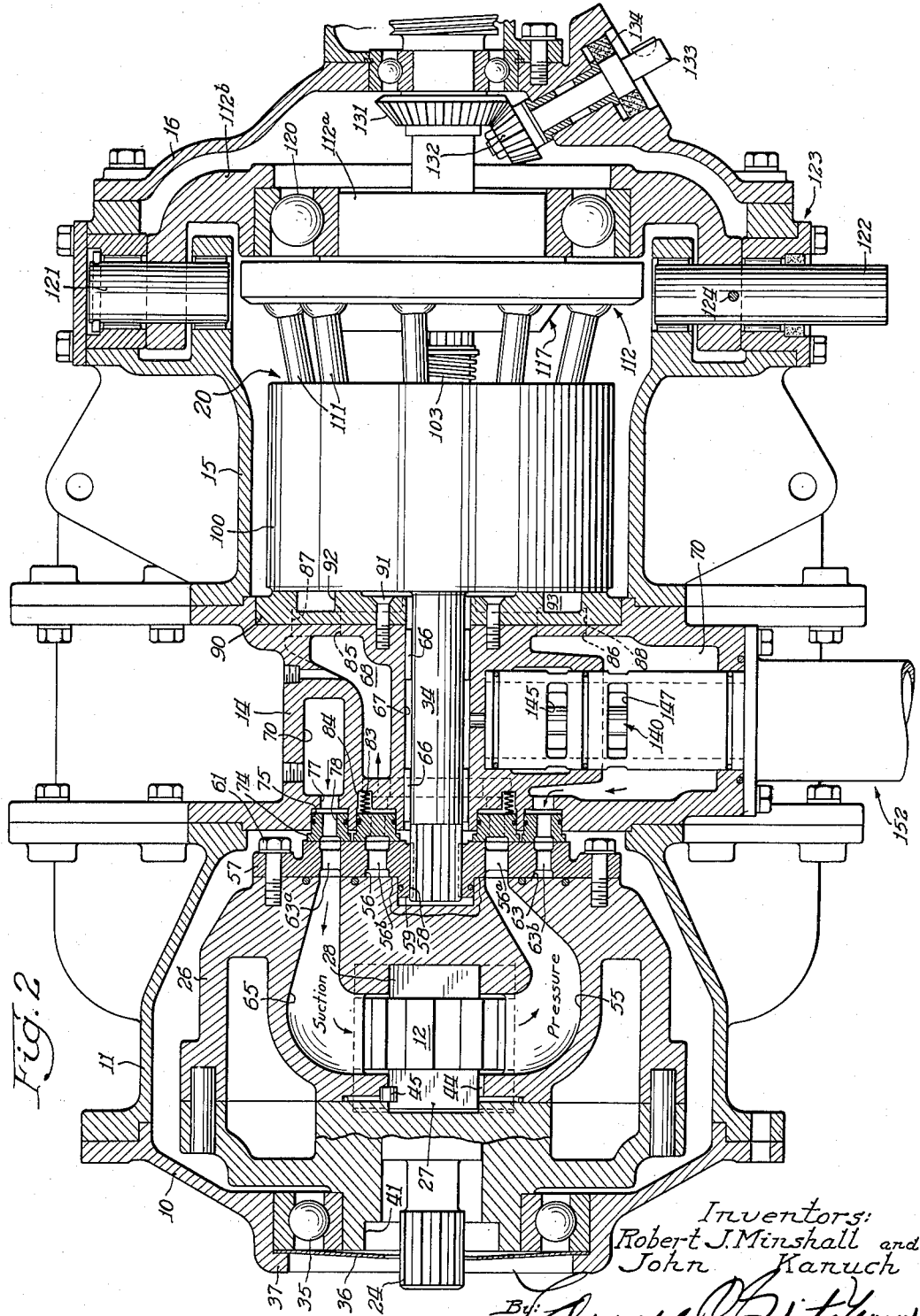

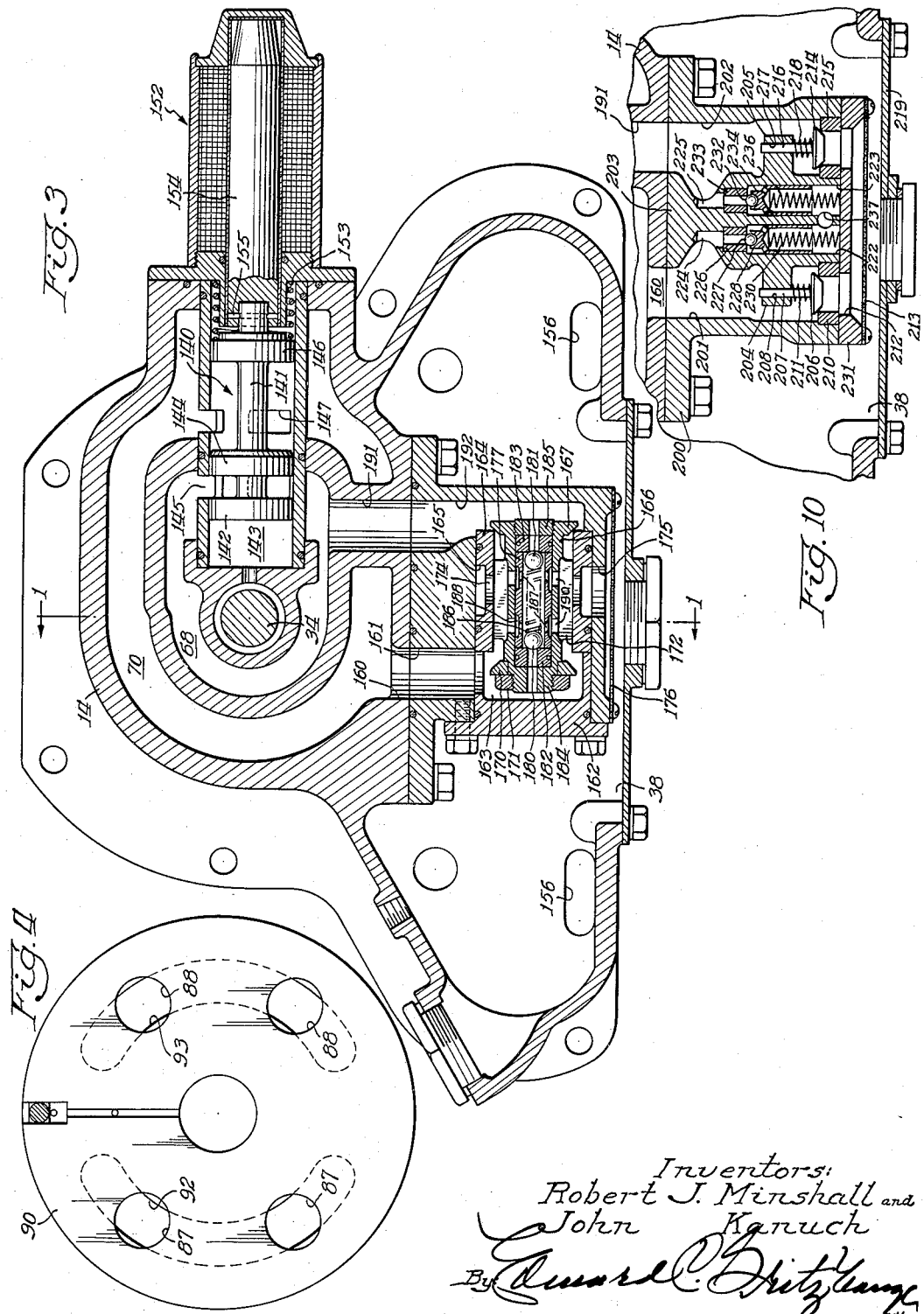

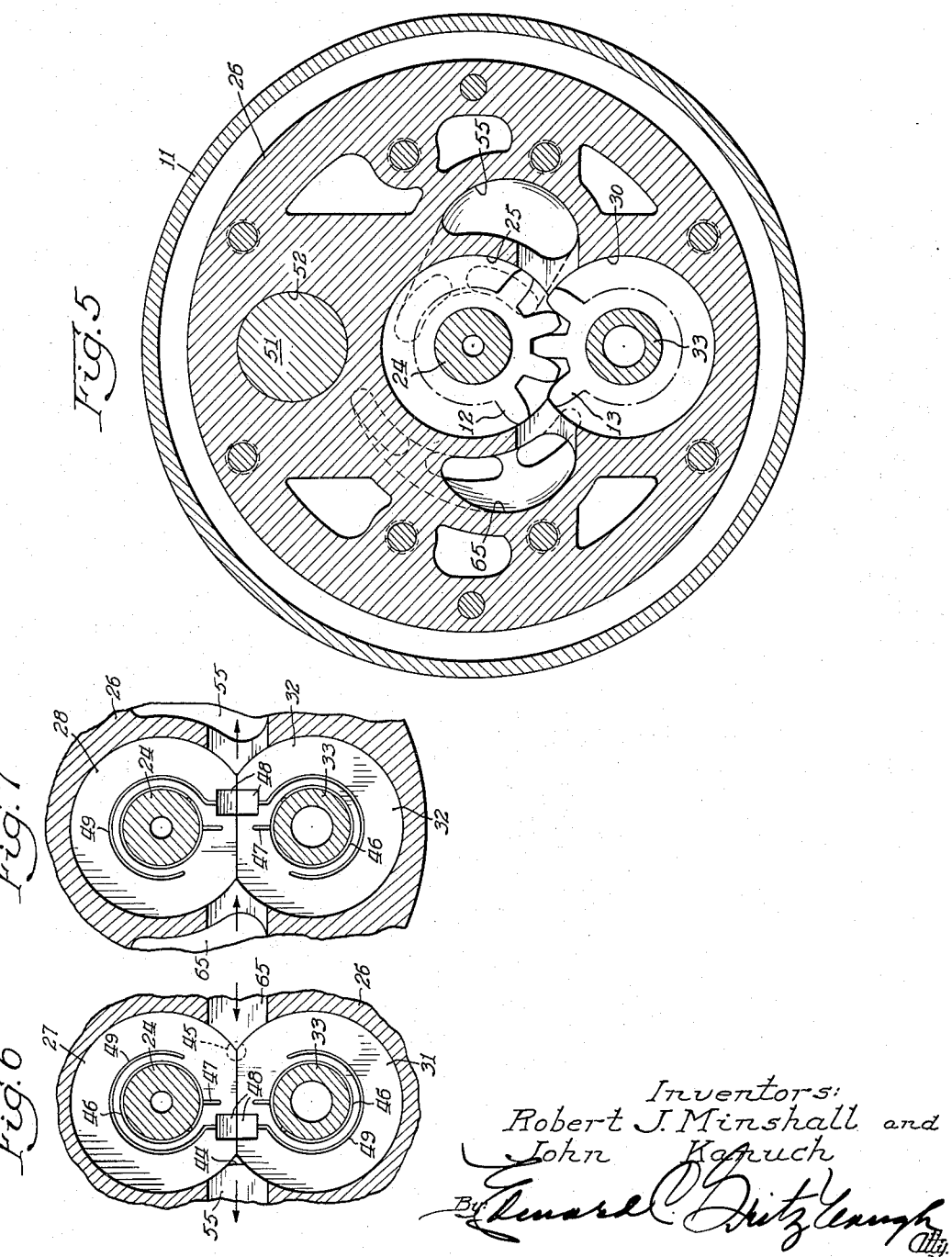

United States Patent Office 2,718,758
Patented Sept. 27, 1955

2,718,758

VARIABLE RATIO HYDROSTATIC TRANSMISSION

Robert J. Minshall, Shaker Heights, and John Kanuch, Cleveland, Ohio, assignors to Borg-Warner Corporation, Chicago, Ill., a corporation of Illinois Application July 15, 1949, Serial No. 104,924

8 Claims. (Cl. 60—53)

This invention relates to a transmission, and more particularly, to a hydraulic transmission of the type employing a fluid pressure generator and a fluid pressure motor.

Hydraulic transmissions, and particularly hydrostatic transmissions, are well known in the transmission art. Such transmissions enable continuous variation of torque ratio. However, it has been found that in hydrostatic transmissions heretofore known, there is a sharp decrease in efficiency as the velocity of fluid flow increases. Thus, while such transmissions have been relatively efficient at low speed operation, at high speeds the efficiency becomes very much lower and renders the transmission unsuitable for many applications. A particular disadvantage has been the high weight to horsepower transmitted ratio, a ratio of twenty-five pounds to each horsepower not being uncommon. Also, such transmissions generally require very high operating pressures and consequently leakage has been extremely difficult to avoid.

An object of the present invention is to provide a new and improved hydrostatic transmission.

A further object of the present invention is to provide a hydrostatic transmission wherein the decrease of efficiency as the operating speed is increased is held in a minimum or entirely avoided.

A further object of the present invention is to provide a hydrostatic transmission capable of operating at high pressures with minimum leakage.

Another object of this invention is to provide a hydrostatic type transmission wherein the ratio of weight to horsepower transmitted is substantially lower than in prior art devices.

Still another object of the present invention is to provide a hydrostatic transmission capable of operating efficiently both in forward and reverse directions.

In accordance with one embodiment of this invention, a hydrostatic transmission may comprise essentially three elements: (a) a fluid pressure generator, which in this embodiment is a pressure loaded gear pump; (b) a control assembly, that is, a valve block and reservoir; and (c) a hydraulic motor connected to the pump through the accumulator assembly, the hydraulic motor in this embodiment being a variable displacement fluid motor of the type comprising a plurality of radially disposed pistons and cylinders and an associated swash plate serving as the reaction member whereby torque is transferred to a driven shaft. Means are incorporated in this transmission to permit operation of the fluid pressure generator without operation of the fluid motor, as well as to permit the hydraulic motor to become the fluid preessure generator and thus drive the gear pump. Pressure responsive manifolding means are employed to control the flow of fluid between the pump and the control assembly.

More specifically, the transmission of this invention comprises a housing incorporating in one end portion thereof a driving shaft having secured thereto for rotation therewith one of the two intermeshing gears of a gear pump, the second of the intermeshing gears being journalled in a carrier arranged to rotate about the first gear, in accordance with the rotation of the output shaft by the hydraulic motor. Thus, as the output or driven shaft begins to rotate, the second pump gear will tend to planetate about the first, thereby reducing the output of the pump. In the initial stage of operation, that is, as power is initially applied to the input shaft of this transmission, the second gear does not planetate since the carrier is stationary and, therefore, the gear pump delivers maximum output to the hydraulic motor. However, as the driven or output shaft associated with the hydraulic motor begins to rotate, the gear carrier rotates with this shaft, causing the outer gear element to begin to planetate about the central gear element, thereby automatically reducing the output of the gear pump as the needs of the hydraulic motor also become less. As the transmission approaches a one-to-one ratio, the output of the gear pump approaches zero; at a one-to-one ratio, the output of the gear pump is substantially zero and, in effect, a direct mechanical drive is obtained, thus providing a high degree of efficiency and avoiding a major disadvantage heretofore considered inherent in many hydrostatic type transmissions.

Other objects and advantages of the present invention will be apparent from the following detailed description taken in conjunction with the drawing wherein:

Fig. 1 is an axial, sectional view of a hydrostatic transmission constructed in accordance with one embodiment of this invention, the view being taken substantially along the line 1—1 of Fig. 3;

Fig. 2 is a sectional view taken substantially along the line 2—2 of Fig. 1;

Fig. 3 is a slightly enlarged, transverse, sectional view taken substantially along the line 3—3 of Fig. 1;

Fig. 4 is a detail, elevational view of the manifold porting plate looking in the direction of arrows 4—4 of Fig. 1;

Fig. 5 is a tranverse, sectional view taken substantially along the line 5—5 of Fig. 1 and showing primarily the gear pump of this invention;

Fig. 6 is a detail, sectional view taken substantially along the line 6—6 of Fig. 1 and showing the left pump bushing assembly in Fig. 1;

Fig. 7 is a detail, sectional view taken substantially along the line 7—7 of Fig. 1 showing the right pump bushing assembly in Fig. 1;

Fig. 8 is an enlarged, transverse, sectional view taken substantially along the line 8—8 of Fig. 1 and showing the thrust plate at the right end of the rotating pump gear housing;

Fig. 9 is an enlarged, transverse, sectional view taken substantially along the line 9—9 of Fig. 1 showing the porting arrangement of the control housing or accumulator which cooperates with the thrust plate shown in Fig. 8; and Fig. 10 is a fragmentary view similar to Fig. 3 showing an alternative intake and check valve assembly.

Referring now to the drawings, and particularly to Figs. 1 and 2 thereof, it will be seen that the transmission of this invention is enclosed in an elongated, sectional housing comprising, from left to right, a first or left end section 10 of substantially bell-shape, and a second, generally cylindrical section 11, rigidly secured to the first section. The first two sections enclose the fluid pressure generator portion of this transmission which, in accordance with this embodiment of the invention, is an intermeshing gear pump having a driving gear element 12 and a driven gear element 13. Secured to the right end of pump housing section 11 is a middle housing section 14 having suitable porting apertures and chambers formed therein to provide the control portion of the transmission and also a sump tank 38. Right housing section 15, of generally cylindrical form, and right end housing section 16 of bell-shape, similar to left housing section 10, enclose the variable displacement hydraulic motor designated generally at 20. Sections 15 and 16 are rigidly connected together and affixed to the right end of housing section 14. The entire transmission housing is arranged to form a substantially oil-tight enclosure and suitable sealing or packing means (not shown) is incorporated between the several sections thereof.

Power is normally applied to this transmission from an input shaft 21 (show fragmentarily), which shaft may be the crankshaft of a vehicle motor, for example, and has associated therewith a flywheel 22, the right end of shaft 21 being located adjacent the left end of left housing section 10. Input shaft 21 is bolted or otherwise secured to the flywheel 22 in accordance with conventional practice, and hub 22a of flywheel 22 is provided with a centrally disposed, axially extending, splined aperture 23 in which the correspondingly splined left end of a gear pump shaft or journal 24 is received. Shaft 24 supports pump gear 12 and extends to the right through the housing sections 10 and 11 and thus through a central bore 25 formed in a pump gear housing or gear carrier 26 of generally cylindrical form, the bore 25 being of suitable configuration to receive pump gear 12 and radially flanged left and right bushings 27 and 28 disposed on either side of this pump gear. Bushings 27 and 28 are arranged so their opposed flanged surfaces engage the side surfaces of gear 12 in sealing relation, while their sleeve portions constitute journal bearings for the shaft 24. While in the embodiment shown, bushings 27 and 28 are of the flanged or stepped type, unstepped bushings may be employed instead. Gear element 12 is, of course, suitably keyed to shaft 24 for rotation therewith.

As shown in Figs. 1 and 5, a second bore 30 having its axis parallel to bore 25 is provided in the gear carrier or housing element 26, bore 30 being spaced radially outwardly of the bore 25 to receive and enclose the driven pump gear 13. Bore 30 is of suitable configuration to receive also flanged left and right bushings 31 and 32, similar to bushings 27 and 28, and disposed on either side of pump gear 13, these bushings being arranged so that their opposed flanged surfaces engage the side surfaces of gear 13 in sealing relation and so that the sleeve portions of these two bushings rotatably support shaft or journal 33 of gear 13.

As may be seen in Figs. 1 and 2, gear carrier 26 is supported at its right end on a splined left portion of transmission output or propeller shaft 34, the output shaft 34 extending to the right through housing sections 14, 15 and 16. Carrier 26 is supported at its left end on annular roller bearing assembly 35 whereby carrier 26 may rotate relatively to the housing sections 10 and 11. Roller bearing assembly 35 is mounted within the left portion of housing section 10. Annular oil shield disc 36 is interposed between the left end of the outer element of bearing assembly 35 and the right side of inwardly extending flange 37 of housing section 10 and packing seal ring 40 is mounted in annular recess 41 formed in the left end of carrier 26 adjacent the right end of hub 22a of flywheel 22. The inner edge of shield 36 extends almost to the periphery of hub 22a and together with seal 40, which fits closely about hub 22a, serves to prevent oil leakage from the transmission. It will be understood that the carrier 26 is made in at least two sections, as shown, to facilitate assembly of the several pump parts located therewithin.

Since this transmission is designed to operate at high pressures, it is desirable that the gear pump be of the type employing pressure loaded bushings. Thus, bushings 27 and 31 are made axially movable with respect to their associated gears 12 and 13, by providing sufficient end clearance in the bores 25 and 30, and bushings 27 and 31 are biased toward their associated gears by small, coiled springs 42 disposed in axially extending recesses 43 formed in the rear of the radially flanged portions thereof. The outer or left ends of springs 42 bear against the adjacent walls of bores 25 and 30, respectively, and three such springs may be employed for each bushing.

Pressure generated by the gear pump is communicated from the outlet or discharge side thereof to the motive or pressure responsive surfaces of the movable bushings 27 and 31 through a passage 44 provided between the peripheries of the flanged portions of the bushings 27 and 31 on the discharge side of the pump at their point of convergence, as shown in Fig. 6. The converging peripheries of bushing flanges 28 and 32 at the opposed extremity of the mating surfaces would normally likewise form with the housing a passage similar to passage 44, but this is prevented by the drilling of an axially extending bore and inserting therein a closure plug 45, thus preventing the recirculation of pressure fluid back to the inlet side of the gear teeth.

It will be noted that the radial, inner terminal portions of the forward or gear engaging surfaces of the bushings have formed therein relief recesses 46 of annular configuration, these relief recesses being placed in communication with the low pressure or inlet side of the pump through axially extending channels or grooves 47 formed through the bushings. These recesses control the effective area of the opposed bushing surfaces and, hence, the axial forces tending to produce relative axial movement between the bushing flanges and the gear side faces, which forces, if permitted, would break the pumping seal.

To provide the requisite lubrication, complementary recesses 48 are provided in the opposed surfaces of the two sets of bushings, these recesses communicating with annular grooves 49 extending substantially, but not all the way around the opposed surfaces and functioning to communicate lubricant, that is the fluid being pumped, thereabout. This prevents undue wear which might otherwise occur because of the axial movement of the bushings into and out of sealing engagement with the gear side faces.

A more detailed description and explanation of the operation of a pressure loaded gear pump of this type may be found in the application of John A. Lauck, Serial No. 774,720, filed September 18, 1947, which has now matured into U. S. Patent No. 2,505,191. It will be understood, of course, that other types of pressure loaded pumps may be also employed without departing from the spirit or scope of the present invention.

In the operation of the gear pump, as the output shaft of the transmission begins to turn, the carrier 26, being keyed to the shaft 34, also rotates. It is, thus, necessary to counterbalance the weight of the gear element 13 and associated bushings, and for this purpose a weight 51 is located in a chamber 52 formed in the carrier 26 and disposed substantially diametrically opposite bore 30. The weight 51 may comprise lead or other suitable counterbalancing material and after assembly, the pump is statically and dynamically balanced by adding or removing lead as required.

A particular feature of this transmission is that while incorporating a pressure loaded gear pump, means are also provided for permitting the hydraulic motor 20 to drive the pump. Thus, where the transmission is incorporated in a motor vehicle, it is possible by pushing the vehicle to turn the engine or, as is more frequently desirable, to permit the engine to operate as a brake. An annular ridge 54 is provided on the rear surfaces of the flanged portions of axially movable bushings 27 and 31, and the height of this ridge, that is, the axial extension thereof, is critically selected to permit the bushing to move away from the associated gear side surfaces a limited distance where it is desired to unload substantially the pressure thereon, but also to restrict the distance which the bushings may move away from the gears so that upon application of fluid pressure to the pump from the normal suction passages, as will be hereinafter described, the pump will operate with sufficient efficiency as a motor to drive the input shaft 21.

In the normal operation of the transmission, however, the gear pump is pressure loaded and delivers output pressure through an outlet passage 55 formed in carrier 26, as shown in Fig. 2. Outlet passage or chamber 55 communicates at its right end with porting passage 56, of generally annular configuration, formed in an end thrust plate 57 secured to the right end of carrier 26. It will be evident from Figs. 1 and 8 that the thrust plate 57 is of generally disc-like configuration and provided with a splined, central aperture 58 through its hub 59 in which the splined left end of output shaft 34 is received. The carrier 26 is thus supported by the thrust plate 57 which is, in turn, supported on the shaft 34, thrust plate 57 being bolted to carrier 26 as by bolts 61.

As may be seen in Figs. 1, 2 and 8, generally annular porting passage 56 contains struts 62, integrally formed with thrust plate 57 whereby the passage 56 is interrupted to define two axially extending, arcuate slots 56a and three axially extending apertures 56b. The struts 62 are of lesser thickness, looking in an axial direction, than the plate 57 and do not prevent passage of fluid around the annular passage. A second, generally annular porting passage 63 is formed in thrust plate 57 and spaced radially outward of the passage 56. Passage 63 is concentric with passage 56 and provided with struts 64 similar to the struts 62 to define three arcuate slots or passages 63a and five apertures 63b, similar to slots 56a and apertures 56b, respectively. This second porting passage 63 communicates at its left end with suction passage 65 formed in the body of carrier 26 and extending to the inlet of the intermeshing gear pump.

Referring now to Figs. 1, 2 and 3, it will be noted that the middle housing section 14 forming the valving block or accumulator control assembly of the transmission is stationary with respect to the other housing sections, being bolted thereto, and the shaft 34 is journalled axially therethrough, roller bearings 66 being provided about the periphery of shaft 34, as clearly shown in Figs. 1 and 2, and interposed between the wall of axially extending journal aperture 67, formed in block 14 through which the shaft 34 extends, and the shaft. A first or pressure chamber 68 is formed in the body of the valving block 14 and disposed radially inward of a second or suction chamber 70 similarly formed in the block 14.

As shown in Figs. 1 and 9 pressure chamber 68 communicates with the outlet side of the pump through a plurality of arcuate apertures 71 (see particularly Figure 9) formed in a pressure loadable, axially displaceable thrust seal ring 72 disposed in an annular recess 73 formed in the left side of valving block 14. A similar thrust seal ring 74 is associated with the suction chamber 70 and disposed radially outward of thrust ring 72, being positioned in an annular recess 75 disposed coaxially of recess 73 in the left end wall of block 14. Recesses 73 and 75 are made somewhat deeper than the thickness of thrust rings 72 and 74 and, thus, these rings are capable of limited axial adjustment, thereby permitting pressure loading.

Referring now to Fig. 1, it will be seen that arcuate passages 76 associated with chamber 68 are formed in the left side of valve block 14 and register with thrust ring apertures 71, thereby providing a pressure path from the outlet side of the pump to the pressure chamber 68. Suction chamber 70 has a plurality of arcuate passages 77 formed at the left end thereof and aligned with arcuate, axially extending apertures 78 formed in the outer thrust seal ring 74, thus connecting the suction passage 70 with the inlet side of the intermeshing gear pump through porting passage 63 formed in thrust plate 57 and passage 65.

Pins 80 are affixed to the thrust rings 72 and 74 and extend axially rearwardly, that is to the right, therefrom into the valving block 14 and into the porting apertures or passages 76 and 77 to prevent relative rotation of the thrust rings with respect to the block 14, while permitting axial displacement of the rings. When the pump is normally operating and delivering pressure through the discharge passage 55, output pressure will be applied to the right side of the thrust seal ring 72, thus urging the ring into engagement with the surface of end plate 57 and maintaining a sealing contact therewith. Because of the initial sealing effect provided by the biasing springs 83, there is a radial pressure gradient at the left face of the seal ring, the gradient extending from a maximum value adjacent the apertures corresponding to the pressure applied over the entire right face of the seal ring to a lesser value in the areas more remote from the apertures formed in the seal ring through which pressure is communicated to the valving block. In this manner there is a lesser force acting in the direction tending to move the seal ring to the right than there is to the left and, therefore, a pressure loaded seal condition is obtained. Under this condition of normal operation, no pressure is applied to the right terminal surface of sealing ring 74. However, when the hydraulic motor 20 operates as a pump, then sealing ring 74 becomes pressure loaded, as will be readily apparent, whereas sealing ring 72 is unloaded. This arrangement makes for maximum efficiency and, at the same time, holds friction to a minimum. Springs 83 received in recesses 84 formed in the left side of valving block 14 normally bias the thrust seal rings 72 and 74 toward the end plate 57 of carrier 26.

In order to control application of pressure to hydraulic motor 20, the right end of valving block 14 has formed therein radially spaced apertures 85 and 86, shown in Fig. 2, which apertures extend axially to the right and are aligned with an equal number of complementarily spaced, axially extending holes 87 and 88 formed in a manifold porting plate 90. Porting plate 90 is secured to valving block 14 by axially extending bolts 91. The apertures 85 communicate at their left ends with the pressure chamber 68, while the apertures 86 communicate at their left ends with the suction chamber 70. Referring now to Fig. 4, it will be seen that holes 87 formed in manifold plate 90 terminate at their right ends, as viewed in Figs. 1 and 2, in arcuate, pressure ports 92, while holes 88 terminate at their right ends in arcuate suction ports 93. The hydraulic motor 20 bears against manifold plate 90 at its left side and is rotatable relatively thereto, the rotation of the motor bringing the cylinders thereof sequentially into communication with the two arcuate or kidney ports 92 and 93, thus alternately applying pressure and suction to drive the motor 20 as will now be described.

Referring now in detail to the variable displacement hydraulic motor 20, it will be noted that the motor comprises a cylinder block 100 having a plurality of equally radially spaced cylinders 101 formed therein and extending axially therethrough, the left ends of cylinders 101 terminating in ports 102 of substantially reduced cross-section. The inner wall portions 102a of ports 102 form pressure responsive motive surfaces for urging the block 100 into sealing engagement with manifold 90 and these areas are carefully proportioned with respect to the forward areas 102b so that the total area of areas 102a exceeds that of 102b by a slight margin in accordance with established pressure loading practice. Annular grooves 102c formed in the forward surface of the cylinder block communicate directly to the sump portion of the transmission and thus limit the effective area 102b.

The ports 102 are adapted to register at their left ends with the arcuate kidney ports 92 and 93 formed in the manifold porting plate 90. Cylinder block 100 is supported on and splined to shaft 34, being urged toward manifold plate 90 by a helically coiled spring 103 disposed about shaft 34 as shown in Fig. 1, the left portion of spring 103 being received in a deep, cylindrical recess 104 formed at the center of the motor cylinder block, while the right portion of spring 103 extends to the right and bears against a retaining ring 105, which is held in position on shaft 34 by a split ring 106 positioned in an annular groove 107 formed about the periphery of the shaft 34. Spring 103 serves to press the cylinder block 100 against the manifold plate 90 when no load is being transmitted. During transmission of power, the fluid pressure in the cylinders acting against the motive areas 102a keeps the left end of block 100 in close contact with manifold plate 90.

A piston 110 is slidably disposed in each cylinder 101, of which in the embodiment illustrated there are nine, and each piston has associated therewith a piston rod 111 whereby connection is made between the piston and a swash plate designated generally at 112. At each end of each connecting rod 111 a ball 113 is formed, the ball at the left end being received in a suitable spherical recess 114 formed in the piston 110, while the ball at the right end is received in a socket cup 115 mounted in the swash plate 112. These spherical terminations permit angular displacement of the connecting rods 111 with respect to the axis of reciprocation of pistons 110 as the position or inclination of the swash plate 112 is varied.

More specifically, the swash plate assembly 112 comprises an inner, annular, dish-shaped socket cup housing 112a having associated therewith a universal joint 117, which is splined to shaft 34 for rotation therewith, and an outer, generally annular, supporting carrier or collar 112b, the angular position of which may be varied with respect to shaft 34 about an axis transverse to the axis of shaft 34 and displaced from the axis thereof. An annular bearing assembly 120 is interposed between the outer member 112b of the swash plate and the socket housing 112a, and thus the socket housing 112a may rotate with respect to the outer member 112b in a plane determined by the angular position of the outer member.

Outer member or carrier 112b is supported on a pair of oppositely disposed, radially extending stub shafts 121 and 122, as shown in Fig. 2. Stub shaft 121 and stub shaft 122 are journalled in suitable trunnion bearings indicated generally at 123, which bearings are mounted between the housing sections 15 and 16. Stub shaft 122 is keyed to carrier 112b by a pin 124, which extends transversely through the shaft, and thus by rotating shaft 122, the annular adjustment or inclination of the swash plate assembly 112 may be controlled.

Constant velocity universal joint 117 is of well known design and comprises an axially apertured bushing 125 splined on shaft 34 adjacent the right end of spring retaining ring 105. Bushing 125 has a plurality of longitudinally extending grooves 127 formed across its periphery, which is arcuate and presents a generally spherical cooperating surface to the arcuate, inner surface of annular socket housing 112a, and a plurality of ball bearings 126 are disposed in the grooves 127, being held in a retaining member 128 in accordance with conventional practice. The inner peripheral surface of socket housing 112a is also splined or grooved as shown at 129 and the outer portions of the ball bearings 126 are received in these splines 129. A constant velocity universal joint is essential to the successful operation of this type of hydraulic motor in order that uniformity of transmission of motion be provided in all angular positions of the swash plate. In a constant velocity universal joint of the type illustrated, the point of contact, or of motion transferred, is always at equal radial distances from the axes of the two elements, that is, the point of contact always lies in a plane bisecting the angle between the connected elements.

The swash plate assembly is thus pivotable about the axis of shafts 121 and 122, and the socket housing 112a, while rotatable relatively to the supporting carrier 112b as the hydraulic motor block and shaft 34 are rotated, is not rotatable with respect to shaft 34. By rotating stub shaft 122 and thereby pivoting carrier 112b, the relative inclination of swash plate assembly 112 may be changed, and the effective displacement of the hydraulic motor may thus be varied from a minimum when the plate is at right angles to shaft 34 to a maximum as the angle of inclination toward the shaft 34 is reduced in either direction.

Shaft 34 extends to the right through a suitable roller bearing assembly indicated generally at 130 and mounted in the right end of housing 16, the shaft being rotatably supported thereby. A bevel gear 131 is mounted on the shaft 34 adjacent the left end of bearing assembly 130 and thus positioned within housing section 16. This gear meshes with a second bevel gear 132 mounted on shaft 133 which extends through a suitable bearing and packing assembly 134 mounted in the housing section 16. Shaft 133 may be connected to a governor or other control arrangement connected in turn to shaft 122 whereby the inclination of the swash plate 112 may be varied in accordance with the speed of rotation of the output shaft 34 or may be varied in accordance with a plurality of factors, such as speed and load, integrated by the control arrangement. As this control arrangement forms no part of the present invention and is not claimed herein, no further description thereof is believed required.

It will be evident from the foregoing that liquid pressure from the gear pump is applied through arcuate kidney port 92 in manifold plate 90 to the cylinders 101 having their ports 102 in communication therewith. The pistons in these cylinders under pressure tend to move to the right, pressing against the socket housing ring of swash plate 112, which ring constitutes the reaction member of the hydraulic motor, and thus a rotative force is applied to the output shaft 34. At the same time, arcuate kidney port 93, in communication with the inlet side of the gear pump, permits liquid in the cylinders having their ports 102 in communication therewith to be exhausted therefrom. The pressure thus applied to pistons 110 causes the socket ring to rotate the universal joint and thereby rotate shaft 34.

As is well known, the ratio of torque multiplication provided in a variable displacement hydraulic transmission of this type depends on the displacement of the motor 20 in relation to the displacement of the pressure generator or pump, and thus, by changing the inclination of the swash plate 112, whereby the displacement of the motor may be continuously varied throughout the range of the motor, the torque multiplication may be continuously adjusted over a wide ratio. Ordinarily, at the start position, swash plate 112 will be tilted to its maximum degree and thus maximum torque multiplication obtained. As the speed of shaft rotation increases and/or the load decreases, the torque multiplication requirement is reduced and the displacement of the motor may be reduced by adjusting the inclination of the swash plate toward a position where it lies in a plane at substantially right angles to the axis of shaft 34.

It is a feature of this transmission that the output of the pump is automatically, that is inherently correlated with the needs of the hydraulic motor. Thus, rotation of shaft 34 for a given engine speed, that is speed of input shaft 21, reduces proportionately the output of the gear pump. For any given swash plate angle, the gear pump automatically establishes the proper torque and speed ratio. At the point where shaft 34 would be rotating at the speed of input shaft 21, the gear pump, in effect, would lock, the hydraulic motor swash plate would be at right angles to shaft 34 and require no fluid flow and, accordingly, a one-to-one ratio, a direct drive would be obtained. Due to unavoidable slippage and leakage, this condition can only be approached.

The foregoing is descriptive of forward operation.

In reverse, the swash plate 112 is tilted to the left, as viewed in Fig. 1, that is in a counterclockwise direction. Because the torque multiplication obtainable for a given swash plate inclination is less in reverse than forward, ordinarily the swash plate would be tilted to the maximum degree for reverse operation.

It is, of course, desirable to provide some means for placing the transmission in a neutral condition. This is accomplished in accordance with the present invention by means of an axially shiftable spool valve 140, located in housing section 14 and most clearly shown in Fig. 3. Valve 140 controls the passage of fluid from chamber 68 formed in the valving block 14 to the suction chamber 70. Thus, in the position in which the valve is shown in Fig. 3, passage of fluid under pressure from chamber 68 to chamber 70 is prevented and pressure is, therefore, supplied to the hydraulic motor. It will be obvious, however, that were the spool valve moved to the left sufficiently, a passage would be afforded from chamber 68 through the spool valve to chamber 70, thus returning the output pressure to the inlet side of the pump and by-passing motor 20.

Referring now more in detail to the spool valve 140 and the associated elements, it will be noted that spool valve 140 comprises a shaft or stem 141 extending at substantially right angles to shaft 34 and having formed at the left end thereof, as viewed in Fig. 3, a first valve disc 142, the periphery of which slidably engages the cylindrical wall of valve chamber 143. A second valve disc 144 of similar size is formed on stem 141 and is spaced slightly to the right of disc 142, the width of the space between the discs 142 and 144 being substantially the width of the apertures 145 formed in the sides of valve chamber 143 and communicating with pressure chamber 68, as shown. Thus, when the spool valve 140 is in the position shown, a continuous passage is afforded around the more or less annular chamber 68 through the openings 145 and the space between the discs 142 and 144 within chamber 143. To the right of disc 144 a third valve disc 146 is formed on shaft 141, this disc being spaced substantially from the disc 144. Suction chamber 70 communicates with valve chamber 143 through apertures 147 formed in the wall of chamber 143 and the valve discs 144 and 146 are so located that in any position of the spool valve, the apertures 147 are in communication with the annular space lying between discs 144 and 146. Thus, a substantially continuous passage is afforded through the generally annular chamber 70 at all times. Now, if the spool valve 140 be moved to the left to the furthest extent possible, that is to say moved to the left sufficiently to cause disc 142 to engage the end wall of the valve chamber, then the disc 144 will be positioned immediately to the left of the left side of aperture 145. Because of the spacing between the disc 144 and the disc 146, a passage is thereby provided from chamber 67 to chamber 70, the passage comprising the apertures 145, the space between the discs 144 and 146 within the valve chamber 143 and the apertures 147. Thus, in the second position of the spool valve 140, pressure generated by the intermeshing gear pump is returned to the inlet side or suction side thereof.

In order to control the position of the spool valve 140 from a remote location, a solenoid indicated generally at 152 may be employed. This showing is merely exemplary, however, and manual means may be employed with equally satisfactory control, in many instances. In the embodiment illustrated, a coiled compression spring 153 is disposed about the right end of valve stem 141 and arranged to urge the valve toward a neutral or by-pass position, while a solenoid core 154 is connected to the right end of stem 141 by a transversely extending pin 155 carried by the left end of core 154. The left end of core 154 is recessed to receive the right end of stem 141. Upon application of current of suitable polarity to the solenoid coil, the core moves to the right, as viewed in Fig. 3, against the force of spring 153. Upon removing current from the solenoid coil, spring 153 shifts the spool valve 140 from the position shown to the position where it by-passes the pressure generated by the gear pump. The solenoid control makes feasible location of a solenoid control switch at the dashboard of a vehicle, or association of such a switch with the accelerator whereby, for example, the transmission may be maintained in neutral until the accelerator pedal is depressed to engage the switch and cause the solenoid to move the control valve 140 to the position illustrated.

The oil supply for the transmission is contained within the lower portions of the several sections of the housing of the transmission, partially filling the same, and the transmission is designed to be located so that the oil drains into the sump tank 38 formed in the lower portion of housing section 14, suitable apertures such as the apertures 156 being formed in the end walls of the sump tank adjacent the base thereof to permit drainage.

In order to connect the inlet side of the intermeshing gear pump with the sump 38 when the pump is operating as the pressure generator, suction chamber 70 is normally connected through a port 160, shown in Fig. 3, at the lower side of the chamber to a passage 161 formed in an intake and check valve housing 162. Housing 162 is mounted within the lower portion of transmission housing section 14, being located in the sump 38, as illustrated in Figs. 1 and 3. Passage 161 extends downwardly in Fig. 3 and communicates at its lower end with the left end of a check valve chamber 163 formed in housing 162.

As may be seen from Figs. 1 and 3, chamber 163 is of generally cylindrical configuration and has mounted in the midportion thereof a valve seat sleeve 164 having a wide, annular recess 165 formed about the midportion thereof. Journalled in the valve seat sleeve 164 is a double-ended check valve or shuttle valve assembly comprising an elongated, tubular body portion 166, an annular disc valve 167 integrally formed at the right end thereof, and an annular disc valve 170 mounted adjacent the left end thereof. A retaining ring 171 is threaded on the left end of valve body 166 to hold valve disc 170 rigidly in position thereon. The assembly is of sufficient length with respect to sleeve 164 so that the assembly is axially movable with respect thereto and when one valve is seated on one end of the sleeve, the other valve is spaced from the opposite end of the sleeve. As may be best seen in Fig. 1, the central portion of valve body 166 is of enlarged diameter to form a shoulder 172 of quasi-rectangular cross-section, the corners of which are rounded to fit the inner wall of sleeve 164 and the shoulder is longitudinally channeled at the four opposite sides to form longitudinal recesses 173 of concave, cross-sectional configuration. The longitudinal recesses 173 in the valve body 166 define with the adjacent wall of valve seat sleeve 164 longitudinal passages extending from end to end of the shoulder 172. The wall of the valve seat 164 is provided with four radially extending, equally circumferentially spaced apertures 174 which communicate with the annular recess 165 formed about the periphery of the valve seat. In the position of the parts shown, a passage is afforded through the valve chamber 163, the longitudinal passages 173, the apertures 174 and the annular groove 165 to a passage 175 formed in the base of the intake valve housing 162 and thence to the sump tank 38. A strainer or filter screen 176 is positioned across the base of the intake valve housing and, thus, prevents entry of foreign matter into the valve housing and therefrom into the gear pump.

In order to control the maximum pressures which may be generated by the gear pump, or by the hydraulic motor in the case where it is operating as a pump, it is necessary to provide a relief valve assembly operable to relieve excess pressure under either of the two possible operating conditions of this transmission. Thus, in accordance with this invention, a tubular insert 177 is disposed within valve body 166 and ball check valves 180 and 181 are located at either end of the insert 177, being retained within the insert by rings 182 and 183 positioned adjacent either end of insert 177. Ring 182 is disposed at the left end of insert 177 and the left side of ring 182 seats against the right surface of an inwardly extending flange 184 integrally formed with the left portion of valve body 166. Ring 183 is disposed at the right end of insert 177 and is retained in position by peripherally threaded, annular nut 185, threaded into the right end of hollow valve body 166. A coiled compression spring 186 is positioned between the balls 180 and 181, urging them apart and into engagement with their respective seats, the seats being formed by the opposed inner rims of the rings 182 and 183. The tension of spring 186 is critically selected so that it will permit the ball check valves to open upon the pressure urging them inwardly exceeding a predetermined value. Insert 177 has formed in the side walls thereof two pairs of oppositely disposed, radially extending apertures 187 which respectively communicate at their outer ends with two, wide, peripheral, annular grooves 188 formed in insert 177. Annular grooves 188 in turn register with two suitably spaced apertures 190 formed in valve body shoulder 172, on the lower side thereof, as shown in Figs. 1 and 3.

In the case where the transmission is operating normally, that is, with gear pump generating pressure, pressure is applied to the ball 181 positioned adjacent valve disc 167, whereas when the gear pump is being driven, that is, the hydraulic motor acts as a pump, pressure is applied to the ball 180. Pressure is applied from the pressure chamber 68 to the right end of valve 167, at the right end of valve chamber 163, from a port 191 formed in the lower side of pressure chamber 68 and communicating at its lower end with an upwardly extending passage 192 formed in intake valve housing 162 and extending substantially parallel to the passage 161, and in turn connecting at its lower end to the right end section of divided chamber 163.

It will be evident from the foregoing that pressure from the pressure chamber 68 will cause the shuttle valve to be positioned, as shown in Fig. 3, that is with the valve disc 167 seated on the right end of valve seat sleeve 164. Fluid is then supplied to the gear pump from the sump 38 through apertures 175 and 174, past open valve disc 170 and thence through passage 161 to port 160 communicating with suction chamber 70. Valve disc 167 and associated ball 181 effectively close the path through the check valve to the sump tank 38. Upon pressure exceeding a predetermined level, however, ball check valve 181 will open, providing a return passage to the sump tank 38 and thereby limiting the maximum pressure.

On the other hand, when the hydraulic motor is operating as a pump, pressure will be applied to the left end of intake valve chamber 163 forcing the shuttle valve to the right and causing disc valve 170 to be seated on the left end of valve seat sleeve 164. Fluid is admitted to the hydraulic motor through the passages 191 and 192, open valve 167 and apertures 174 and 175. Ball check valve 180 then closes the return path from the chamber 70 to the sump tank 38, but as in the case of the ball check valve 181, will open in response to pressure exceeding a predetermined level, as set by the tension of spring 186, to limit the maximum pressure.

An alternative arrangement of the intake and check valve assembly immediately hereinbefore described is shown in Fig. 10. From this figure it will be evident that a valve housing 200 may be positioned within the sump tank 38, similarly to housing 162, and is bolted to the underside of the chambered portion of the middle housing section 14. Housing 200 has a generally cylindrical passage 201 formed on the left side thereof, extending downwardly and connecting at its upper end to the port 160 formed at the lower side of suction chamber 70. A similar passage 202 connects at its upper end to the port 187 in the lower side of pressure chamber 68 and extends downwardly through housing 200, substantially parallel to passage 201. The mid portion 203 of housing 200 has a pair of oppositely extending, protruding members or valve guides 204 and 205 formed on either side thereof, the member 204 extending to the left partially into the passage 201 and the member 205 extending to the right partially into the passage 202. Member 204 provides a support for disc valve 206, and the stem 207 of the valve is slidably journalled in an upwardly extending aperture 208 formed in member 204. Valve 206 seats on an annular valve seat 210 positioned at the lower end of passage 201 and a coiled compression spring 211 is disposed about the stem 207 so that the upper end of the spring 211 bears against the under side of member 204, while the lower end of spring 211 bears against the upper side of valve 206, urging it into engagement with the seat 210. Aperture 212 formed in the base of housing 200 communicates with the sump 38 through a filter screen 213.

Similarly, a disc valve 214 is disposed at the lower end of passage 202 and seats on an annular valve seat 215, stem 216 of valve 214 extending upwardly and being slidably journalled in an aperture 217 formed through the member 205. Coiled compression spring 218 is disposed about stem 216 so that its upper end bears against the under side of member 205 and its lower end bears against the upper surface of disc valve 214, urging it into engagement with valve seat 215. An aperture 219 similar to the aperture 212, is formed in the base of housing 200 and connects the passage 202 to the sump tank 38 through the screen 213.

Midsection 203 has two spaced, parallel, elongated relief valve chambers 222 and 223 formed therein and communicating at their upper ends through passages 224 and 225, respectively, to passages 201 and 202, respectively. Annular insert 226, positioned adjacent the upper end of passage 224 forms at its lower end a seat for a ball check valve 227 positioned in chamber 222 and supported therein on a cup-shaped carrier 228. A coiled compression spring 230 is located in the lower portion of left chamber 222 so that the upper end thereof bears against the under side of carrier 228 and the lower end thereof bears against a base portion 231 of the midsection 203 of the housing 200. Similarly, a second ball check valve 232 is disposed in the upper portion of right hand chamber 223 and its upper end seats against the lower end of annular insert 233 positioned adjacent the upper end of passage 225. A carrier 234 supports the ball 232 and a coiled compression spring 236 is disposed within the lower portion of the chamber 223 so that the upper end of the spring bears against the lower side of carrier 234, while its lower end bears against the base 231 of housing section 203. A centrally located passage 237 formed in midsection 203 of housing 200 connects at one end to the lower ends of both chambers 222 and 223 and at its lower end extends to and communicates with sump tank 38.

The operation of this intake and check valve assembly is similar to that previously described, although, as will be readily apparent, this structure is of simpler design and assembly and provides positive operation. Pressure from pressure chamber 68 will keep intake valve 214 closed in the normal operation of the transmission. However, ball valve 232 will open in response to the pressure in passage 202 exceeding a predetermined value, this value being determined by the spring 236. At the same time, valve 206 will open in response to suction in chamber 70. Conversely, when the hydraulic motor operates as a pressure generator, valve 232 opens due to the suction in chamber 68 and valve 206 closes due to the pressure in chamber 70. Under this condition, ball valve 227 controls the maximum pressure in chamber 70 and will open upon this pressure exceeding a predetermined value.

Summary of operation

From the foregoing, it will be understood that this transmission with the gear pump serving as the pressure generator has four operational phases. In the first phase, the transmission is in neutral and the by-pass valve 140 urged to the left, as viewed in Fig. 3, by spring 153 by-passes fluid pressure generated by the gear pump from the pressure chamber 68 through the valve 140 and back to the inlet side of the pump through the suction chamber 70. In the second phase of operation, the solenoid coil 162 is energized, thereby pulling the spool valve 140 to the right so that it assumes the position illustrated in Fig. 3. Fluid is no longer by-passed and pressure is applied from pressure chamber 68 through the manifold porting plate 90 to the hydraulic motor 20. In this second operational phase, the rear wheels of the vehicle are stationary, the swash plate 112 is inclined to its maximum degree to provide maximum torque multiplication for starting and the shaft 34 is not turning. The output of the gear pump is also at a maximum. In the third phase of operation, hydraulic motor 20 begins to drive the rear wheels by rotating shaft 34. Rotation of shaft 34 causes rotation of pump gear carrier 26, thereby reducing the output of the gear pump. As pointed out hereinbefore, however, this reduced output is commensurate with the reduced needs of the hydraulic motor, for as the inertia is overcome and shaft 34 begins to turn, the torque multiplication thereafter required is less and the inclination of the swash plate may be lessened to reduce the volumetric capacity of the motor. In this third phase of operation, the inclination of the swash plate 112 is gradually reduced until it approaches a position at right angles to output shaft 34 and pump gear carrier 26 is rotating at substantially the same speed as input shaft 21. In the fourth and final phase of operation, a substantially direct drive is had, and the gear pump generates only sufficient pressure to make up for leakage and slippage; essentially, the fluid pressure elements are locked and a mechanical drive is had wth resultant high efficiency.

In reverse, the swash plate is tilted in a counterclockwise direction to obtain maximum torque multiplication. Otherwise, the operation is essentially similar to forward drive.

Under a coasting condition or where the vehicle is being pushed, the hydraulic motor will then operate, in effect, as a pump and generate pressure. The various elements reverse the parts they play and, thus, the suction chamber 70 becomes the pressure chamber, while the pressure chamber 68 becomes the suction chamber, and the gear pump becomes a hydraulic motor effective to drive input shaft 21. The normally pressure loaded pump is unloaded, but to maintain sufficient efficiency, the distance which the associated pump bushings may move away from the gear side faces is limited by the ridges provided on the rear surface of the flanged portion of the bushings. Essentially, however, the operational phases are the same as those described in connection with the normal opeartion of the transmission.

Where herein the various parts of this invention have been referred to as being located in a right or a left position, it will be understood that this is done solely for the purpose of facilitating description and that such references relate only to the relative positions of the parts as shown in the accompanying drawings.

While but one embodiment of this invention has been shown and described, it will be understood that many changes and modifications may be made therein without departing from the spirit or scope of the invention.

What is claimed is:

1. In a gear pump and porting arrangement adapted particularly for a hydraulic transmission, a pair of intermeshing gears, a pump housing incorporating said gears and arranged to either remain stationary or to rotate about said gears, means defining inlet and outlet porting openings through the wall of said housing, said means comprising a first annular passage in communication with the outlet side of said gears, a second concentric annular passage communicating with the inlet side of said gears, means defining a stationary control housing having a high pressure passage and a low pressure passage therein, said last-mentioned passages being in communication with said first and second annular passages, respectively, a non-rotating annular manifold carried by said control housing, an axially movable porting ring interposed between said control housing and said pump housing and associated with said first annular passage of said pump housing, said ring engaging said pump housing in sealed relation for cooperation with the ports of said pump housing, whether said pump housing is stationary or rotating, and said ring being provided with pressure responsive surfaces effective to maintain a pressure loading of said ring in contact with said pump housing, said pressure responsive surfaces being subjected to pressure in said passage of said stationary control housing when pressure is communicated through said first annular passage, a second, axially movable porting ring interposed between said control housing and said pump housing and associated with the second annular passage, said second ring engaging said pump housing in sealed relation for cooperation with the ports of said pump housing, whether said pump housing is stationary or rotating, said ring being provided with pressure responsive surfaces effective to maintain pressure loading of said ring in contact with said pump housing, said pressure responsive surfaces being subject to pressure in said passage of said stationary control housing when said pressure is communicated through said second annular passage.

2. The combination in a transmission including a hydraulic gear pump and motor wherein said pump has a pressure loadable bushing engageable with the side face of the corresponding gear for sealing the same in response to pressure generated by said gear and acting on a pressure area connected to said bushing, of positive stop means within said pump effective to limit the extent of axial movement of said bushing away from said gear side facing to provide a definite fixed clearance when said gear pump is being driven as a motor by pressure delivered thereto from said motor driven as a pump, said loading pressure being taken from the output side of said gear pump, whereby when said motor pressure is delivered to the input side of said gear pump for driving the same as a motor, then the loading pressure area is connected with the low pressure side of said gears.

3. In a two path power flow torque converting transmission arrangement, an input shaft and an output shaft, means defining a first path of power flow, said first path of power flow comprising; a gear pump of the intermeshing gear type including an enclosing gear housing, means connecting said gears in driven relationship to the input shaft, axially movable, pressure loadable bushing means associated with the gears of said pump and arranged to be pressure loaded when said pump is driven by said input shaft, means providing for movement of said gear housing about a selected axis at varying differential rates as the output shaft approaches a one-to-one ratio with reference to the input shaft, a multiple plunger variable displacement motor receiving liquid under pressure from said pump and connected to said output shaft for delivering torque to said output shaft; means defining a second path of power flow at least part of which is parallel to said first path, said second path of power flow comprising; said gear housing drivingly connected to said output shaft and adapted to be rotated therewith and to receive torque from said input shaft through the pumping gears, said arrangement being characterized by the fact that the maximum portion of the torque is transmitted through said first path at such time as the input shaft is rotating and the output shaft is stationary or turning at its minimum speed, with an increasing proportion of said torque being transmitted through said second path as said output shaft approaches a one-to-one ratio with the input shaft, said motor being arranged to serve as a pressure generator and said gear pump to serve as a motor when desired to apply torque to said input shaft, said pressure loadable bushing means being arranged to unload when said motor acts as a pump to apply torque to said input shaft, and said arrangement being further characterized by the feature that liquid pressure loadable sealing means are connected with said gear housing and said motor respectively and subject to liquid under pressure to provide for liquid tight connections for transmitting liquid under pressure from said pump to said motor or vice versa.

4. In a fluid transmission incorporating a pressure generator and hydraulic motor, wherein said hydraulic motor may also serve as a pressure generator and said pressure generator serve as a motor, and also incorporating a control housing having duct means connecting said pressure generator to said motor, and a pair of pressure loadable sealing rings disposed between said control housing and said pressure generator, pressure surfaces on said pressure loadable sealing rings, one of said sealing rings being pressure loaded when said pressure generator serves as a pressure source by subjecting the pressure responsive surfaces of said one of said sealing rings to pressure in said duct means, and the other of said sealing rings being pressure loaded when the hydraulic motor serves as a pressure source by subjecting the pressure responsive surfaces of the other of said sealing rings to pressure in said duct means, a double-acting relief valve assembly effective to limit the pressure output of either the motor or the pressure generator to a predetermined maximum value comprising an axially shiftable, hollow valve stem journalled in a valve chamber, a valve disc at either end of said stem, each said valve disc being centrally apertured, a ball check valve associated with each disc and normally closing the central aperture and spring means associated with each ball check valve for holding said ball check valve in closed position.

5. In a fluid transmission, a pressure generator, a hydraulic motor, means permitting said hydraulic motor to serve as a pressure generator and said pressure generator to serve as a motor, duct means connecting said pressure generator and said motor, said duct means including a pair of substantially concentric passages, and a pair of pressure loadable sealing rings disposed between said passages and said pressure generator, pressure surfaces on said pressure loadable sealing rings, one of said sealing rings being pressure loaded when said pressure generator serves as the pressure source by subjecting the pressure responsive surfaces of one of said sealing rings to pressure in one of said concentric passages, and the other of said sealing rings being pressure loaded when the hydraulic motor serves as the pressure source by subjecting the pressure responsive surfaces of the other of said sealing rings to pressure in the other of said concentric passages.

6. The transmission as claimed in claim 5 further including positive acting intake valving means comprising a pair of independently actuable valves, means holding said valves normally in closed position, one of said valves being in fluid communication with one of said concentric passages and the other of said valves being in fluid communication with the other of said concentric passages, said first valve being arranged to open only in response to suction being applied thereto from said hydraulic motor and said second valve being arranged to open only in response to suction being applied thereto by said generator, a first relief valve associated with said positive acting intake valve means and effective to bypass the intake valve upon the pressure from said hydraulic motor exceeding a predetermined value and a second relief valve associated with said intake means and effective to bypass the intake valve upon the pressure in said generator exceeding a predetermined value.

7. In a fluid transmission incorporating a pressure generator including a rotatable pumping element, a hydraulic motor, and a control assembly, pressure loadable, axially movable bushing means located in said pressure generator for maintaining efficiency of said generator, said bushing means moving into sealing relation with said rotatable pumping element in response to application of discharge pressure from said generator, said pressure generator further including positive stop means cooperating with said bushing means restricting axial movement away from said sealing relation to maintain a minimum sealing relationship whereby to permit said generator to be operated as a motor by pressure delivered thereto by said hydraulic motor, a pair of concentric alternately pressure loadable, axially movable sealing rings associated with said control assembly and subject to fluid pressure in said control assembly, and pressure loadable areas associated with said motor for maintaining a seal between said motor and said control assembly and subject to fluid pressure in said motor.

8. A variable ratio hydrostatic transmission comprising an input shaft, an output shaft, an intermeshing gear type pump normally driven by said input shaft and having inlet and outlet ports, a hydraulic motor for driving said output shaft, a valving block assembly for controlling application of pressure from said pump to said motor, a pair of pressure loadable bushings engageable with the adjacent side faces of the corresponding gears of said gear pump in response to discharge pressure from said gear pump being applied to the motive surfaces thereof, positive stop means effective to limit the extent of axial movement of said pressure loadable bushings away from said gear side faces to provide a definite fixed maximum clearance when said gear pump is being driven as a motor by pressure delivered thereto from said motor, a pair of alternately loadable axially movable sealing rings located between said valving block and said inlet and outlet ports respectively, said sealing rings further having pressure responsive surfaces thereon, one of said seal rings being loaded when said pump serves as the pressure generator and the other of said rings being loaded only when said motor serves as the pressure generator by alternately subjecting the pressure responsive surfaces of the sealing rings to force said sealing rings toward said inlet and outlet ports respectively, said motor having a plurality of cylinders and means in said cylinders and subject to pressure in said cylinders for maintaining said motor in sealing relation with said valving assembly during operation of said motor.

References Cited in the file of this patent

UNITED STATES PATENTS

| | | |
|---|---|---|
| 893,480 | Goodrich | June 14, 1908 |
| 1,243,640 | Story | Oct. 16, 1917 |
| 1,444,712 | Smith | Feb. 6, 1923 |
| 1,610,405 | Wingquist | Dec. 14, 1926 |
| 1,701,903 | Wingquist | Feb. 12, 1929 |
| 1,797,439 | Napier | Mar. 24, 1931 |
| 1,797,453 | Thomas | Mar. 24, 1931 |
| 1,800,929 | Craig | Apr. 14, 1931 |
| 1,817,080 | Howard | Aug. 4, 1931 |
| 1,840,869 | Rayburn | Jan. 12, 1932 |
| 1,840,876 | Rayburn | Jan. 12, 1932 |
| 1,843,246 | Sloane | Feb. 2, 1932 |
| 1,914,622 | Smith | June 20, 1933 |
| 2,122,045 | Rose et al. | June 28, 1938 |
| 2,371,922 | Saito | Mar. 20, 1945 |
| 2,388,755 | McLeod | Nov. 13, 1945 |
| 2,389,186 | Dodge | Nov. 20, 1945 |

(Other references on following page)

UNITED STATES PATENTS

| | | |
|---|---|---|
| 2,397,314 | Grosser | Mar. 26, 1946 |
| 2,397,480 | Fullerton | Apr. 2, 1946 |
| 2,412,588 | Lauck | Dec. 17, 1946 |
| 2,444,165 | Lauck | June 29, 1948 |
| 2,469,588 | Aschauer | May 10, 1949 |
| 2,478,481 | Griffith | Aug. 9, 1949 |
| 2,487,732 | Schanzlin | Nov. 8, 1949 |
| 2,608,933 | Ferris | Sept. 2, 1952 |
| 2,645,903 | Elkins | July 21, 1953 |

FOREIGN PATENTS

| | | |
|---|---|---|
| 7,548 | Great Britain | Mar. 28, 1907 |
| 241,975 | Great Britain | Oct. 21, 1925 |
| 253,454 | Great Britain | June 17, 1926 |